United States Patent Office 2,738,342
Patented Mar. 13, 1956

2,738,342

MANUFACTURE OF ARTICLES FROM SYNTHETIC RUBBER LATEX

Charles F. Eckert, Westwood, N. J., assignor to United States Rubber Company, New York, N. Y., a corporation of New Jersey No Drawing. Application September 26, 1952,
Serial No. 311,807

9 Claims. (Cl. 260—85.1)

This invention relates to the manufacture of articles from synthetic rubber latex.

It is known to make articles by direct deposition of synthetic rubber from synthetic rubber latex, as in the production of dipped goods, such as dipped gloves and footwear, as in the manufacture of coated goods, such as coated fabrics and electrical conductors, and as in latex foam sponge manufacture where the compounded latex is formed into a foam, shaped, gelled and dried. The strength of such finished and vulcanized articles, however, is much less than the strength of similar articles formed by direct deposition of rubber from natural Hevea latex; hence various means have been employed to increase the strength of various articles deposited directly from synthetic rubber latices. The strength of articles directly deposited from latices may be measured by the tensile strength of cured films laid down from the latices.

The present invention is more particularly concerned with a method of improving the strength of articles deposited directly from a synthetic rubber latex, such as butadiene-styrene copolymer synthetic rubber latex (GR–S latex), which contains a number of large microscopic particles of from 5 to 50 microns in diameter, which is many times the 0.05 to 0.5 micron average particle diameter of the latex as a whole, and of the more conventional synthetic latices which are free from such extremely large microscopic particles. All average particle diameter measurements referred to herein are based on the area of the particles. Synthetic rubber latices having from 3% to 25% by weight of the rubber solids constituted of such so-called "giant" particles of from 5 to 50 microns in diameter are production latices which the present invention seeks to improve when the latex is to be used for the direct manufacture of articles therefrom. Such giant particles are not retained on conventional filters or screens which are commonly used to filter latices before use. Where the latex is to be coagulated to crude synthetic rubber, there is no particular disadvantage in having such large size particles present in the latex before coagulation.

I have found that if at least 25% of the large particles of from 5 to 50 microns are removed from the latex, as by separating the cream that forms on standing, the remaining skimmed latex will give vulcanized films of greatly enhanced tensile strength. Such creaming in which the bulk of the rubber and only a fraction, if any, of the giant particles remain in the skim portion in usable latex form, is not to be confused with the conventional concentrating of latex with the aid of hydrophilic colloidal creaming agents where, as opposed to the present invention, the bulk of the rubber, including the largest rubber particles, is retained in the usable concentrated cream portion. The cream of large particles according to the present invention will separate on standing, with or without dilution of the latex. The separation of the cream of large particles from the skim may be accelerated by use of a centrifuge such as a dairy cream separator. Such a cream separator is not to be confused with latex concentrating centrifuges, which are used to concentrate natural rubber latex which has a wide particle size distribution, but which generally are not effective to concentrate conventional synthetic rubber latices. While I do not desire to be bound by any theory underlying the present invention, I believe that the extremely large particles produce small areas of weakness in the dry latex films, and that this weakness is due to the inability of the compounding ingredients invariably used with latices to sufficiently penetrate the large particles and thereby to come in contact with the inner portions of them. In any case, the data below will illustrate the great increase in tensile strength of vulcanized films laid down from the latex after removal of some or all of the extremely large size particles, according to the present invention.

The following test is a simple means for determining the percent of the rubber content of the latex that is in the form of giant particles.

Using Stokes' law, one can make calculations which show that the giant particles will separate rapidly under conditions of static creaming. For example, a typical giant particle with a diameter of 20 microns will rise at a rate of approximately 4 centimeters per hour whereas the ordinary sized particles (average diameter 0.2 micron) which constitute the bulk of the rubber will rise only about 0.0004 centimeter per hour in a dilute latex. This is the basis of a simple test for determining quantitatively the amount of giant particles in a synthetic rubber latex. The solids content of the latex is determined. A fifty-gram sample of the synthetic latex is diluted with water to about 10% total solids, to facilitate creaming. About 150 ml. of the dilute latex, or enough to have a depth of 10 cm., is then allowed to stand overnight in a separatory funnel. The lower half of the latex is carefully withdrawn from the bottom and its total solids content is determined. From the change in solids, the percentage of the total rubber which is in the form of giant particles can be readily calculated by using the following equation:

$$\text{Percent giant particles} = \left[\frac{a - b\left(\frac{100-a}{100-b}\right)}{a}\right] \times 100$$

where $a$ is the percent total solids before creaming, and $b$ is the percent total solids in the skim.

The following examples illustrate the invention. All parts and percentages referred to herein are by weight.

EXAMPLE I

A GR–S latex was prepared by polymerizing the following recipe at 50° C. for 50 hours to a conversion of 80%: 70 parts of butadiene-1,3, 30 parts of styrene, 70 parts of water, 1.5 parts of potassium oleate (emulsifier), 0.04 part of potassium hydroxide, 1.5 parts of the condensation product of formaldehyde and sodium naphthalene sulfonate (additional emulsifying and dispersing agent), 0.55 part of sodium sulfate (viscosity reducer), 0.2 part of tertiary dodecyl mercaptan (regulator), 0.3 part of diisopropylbenzene hydroperoxide (catalyst), and 0.15 part of diethylene triamine (activator). At the end of the reaction time, 1.5 parts of a stabilizing soap (potassium oleate) was added as a 20% aqueous solution and 0.2 part of a shortstop (potassium dimethyldithiocarbamate) was added as a 5% aqueous solution. The unreacted butadiene and styrene were removed with the aid of an external heat exchanger in order to minimize dilution of the latex, and the latex was then heat-concentrated to about 62% solids concentration. The thus prepared latex had an average particle diameter of 0.2 micron, and the rubber content thereof comprised 20% by weight of giant particles as determined by the diluting and creaming test set forth above. The electron microscope showed these giant particles to be from 5 to 50 microns in diameter. As in common practice, the nominal diameter of particles which are not truly spherical, but ellipsoidal, is considered to be equal to the major axis of the largest cross-sectional ellipse.

A portion of the above whole latex was diluted to 50% total solids to aid in creaming, and was allowed to stand several days. In accordance with Stokes' law, the larger particles rose to the top of the latex as a dense cream layer, similar in appearance to the cream of unhomogenized cow's milk, and were removed. The lower portion, i. e., the latex, was examined under a light microscope and found to be substantially free from giant particles. The giant particles in the cream layer amounted to 20% by weight of the original latex solids, showing substantially 100% removal of the giant particles.

A batch of each of the original unskimmed or whole latex and the skimmed latex was divided into two portions which were compounded for vulcanization with two different conventional recipes as follows, the amounts of materials designated in the recipes being solids by weight, and the compounding ingredients being added as aqueous solutions or emulsions of the concentrations indicated in parenthesis:

| Recipe A | Parts (Solids) | Recipe B | Parts (Solids) |
| --- | --- | --- | --- |
| Latex solids | 100.0 | Latex solids | 100.0 |
| Potassium hydroxide (20%) | 0.1 | Potassium hydroxide (20%) | 0.10 |
| Potassium oleate (20%) | 3.0 | Potassium oleate (20%) | 3.00 |
| Alkali metal salt of 2-mercaptobenzothiazole (50%) | 1.5 | Zinc salt of 2-mercaptobenzothiazole (30%) | 1.25 |
| Zinc oxide (67%) | 3.0 | Zinc salt of diethyldithiocarbamate (50%) | 0.65 |
| Sulfur (60%) | 2.0 | Sulfur (60%) | 1.50 |
| Antioxidant (50%) | 0.5 | Zinc oxide (67%) | 5.00 |
| | | Antioxidant (50%) | 0.50 |
| Ammonium caseinate (10%) | 1.5 | Ammonium caseinate (10%) | 1.50 |

Films were made from the whole and skimmed latices compounded according to recipes A and B by spreading the latices on aluminum plates and allowing them to dry at room temperature, giving films about 0.012 inch thick. The films were stripped from the aluminum plates and vulcanized in air at 105° C. for 30 minutes and 60 minutes. Average tensile strength and elongation measurements for the various cure times are shown in Table I:

*Table I*

| | Recipe A | | Recipe B | |
| --- | --- | --- | --- | --- |
| | Whole Latex | Skimmed Latex | Whole Latex | Skimmed Latex |
| Avg. Tensile Strength (Lbs. per sq. in.) | 800 | 1,280 | 520 | 1,150 |
| Avg. Elongation (percent) | 640 | 780 | 510 | 600 |

It may be readily seen from the above table that removing all the giant particles according to the present invention gave over 50% improvement in tensile strength of the vulcanizate with one conventional compounding recipe and over 100% improvement with another conventional compounding recipe.

EXAMPLE II

A GR–S latex of 60.1% solids concentration was prepared similarly to the latex of Example I but with less mercaptan modifier to give a rubber of higher Mooney viscosity. A sample of the latex was diluted to 10% solids and allowed to cream on standing overnight according to the above test. It showed 15% giant particles.

A portion of the latex at 60.1% solids was allowed to stand for several days to cream. The skimmed latex was recovered as in Example I and had a solids concentration of 59.1%, showing a removal of about 4% of solids in the cream or about 27% of the giant particles originally present in the latex.

A portion of the original whole or unskimmed latex and a portion of the skimmed latex were compounded for vulcanization according to the following conventional recipe the concentrations of the compounding ingredients in aqueous solution or suspension being indicated in parentheses; latex equivalent to 100 parts of latex solids, 2 parts of potassium oleate (20%), 1.5 parts of alkali metal salt of 2-mercaptobenzothiazole (50%), 3 parts of zinc oxide (67%), 2 parts of sulfur (60%), 0.5 part of antioxidant (50%), and 2 parts of ammonium caseinate (10%).

Films were made from the whole and skimmed latices compounded according to this recipe in two ways. Single layer films about 0.012 inch thick were made on aluminum plates as in Example I. In addition, multilayer films were made by alternately spreading the latex on a continuous belt and drying in air until films of about 0.015 inch thickness had been built up. The films were stripped from the plates and belt and vulcanized in air at 105° C. for 20, 40 and 60 minutes. Average tensile strength and elongation measurements for the various cure times are shown in Table II:

*Table II*

| | Film from Plate | | Film from Belt | |
| --- | --- | --- | --- | --- |
| | Whole Latex | Skimmed Latex | Whole Latex | Skimmed Latex |
| Avg. Tensile Strength (Lb. per sq. in.) | 1,520 | 1,920 | 1,510 | 2,030 |
| Avg. Elongation (percent) | 730 | 800 | 820 | 810 |

It may be readily seen from the above table that removal of about 27% by weight of the giant particles according to the present invention gave a considerable improvement in tensile strength of the vulcanizate, viz. from over 25%, to about 35% increase.

The separated cream portion containing the giant particles may be mixed with synthetic rubber latices that are to be coagulated to crude rubber or may be diluted and directly coagulated by conventional coagulating procedures.

The invention is applicable to synthetic rubber latices other than GR–S latices, as for example, butadiene-polymer latices generally, where they contain 3% to 25% of large particles of 5 to 50 microns in diameter. The polymerizable material in the preparation of such synthetic rubber latices may be one or a mixture of butadiene-1,3 hydrocarbons, for example, butadiene-1,3, methyl-2-butadiene-1,3, piperylene, 2,3-dimethyl butadiene-1,3. The polymerizable material, as is known, may be a mixture of one or more such butadienes with one or more polymerizable compounds which are capable of forming rubber copolymers with butadienes-1,3, for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefins containing a terminal methylene ($CH_2=C<$) group which are copolymerizable with butadienes-1,3, are aryl olefins, such as styrene, vinylnaphthylene, alpha-methylstyrene, para-chlorostyrene, dichlorostyrene; the alpha-methylene carboxylic acids and their esters, nitriles and amides, such as acrylic acid, methyl acrylate, methyl methacrylate, acrylonitrile, methacrylonitrile, methacrylamide; methyl vinyl ether, methyl vinyl ketone; vinylidene chloride. Such synthetic rubbers may be generically termed butadiene polymer synthetic rubbers.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of treating a butadiene polymer synthetic rubber latex having an average particle diameter, based on the area of the particles, of from 0.05 to 0.5 micron and containing 3% to 25% by weight of the rubber solids of large particles from 5 to 50 microns in diameter to improve the strength of articles produced directly from such latex, which comprises solely mechanically separating at least 25% by weight of said large particles from the latex.

2. The method of treating a butadiene polymer synthetic rubber latex having an average particle diameter, based on the area of the particles, of from 0.05 to 0.5 micron and containing 3% to 25% by weight of the rubber solids of large particles from 5 to 50 microns in diameter to improve the strength of articles produced directly from such latex, which comprises separating at least 25% by weight of said large particles from the latex in the absence of chemical treatment of the latex.

3. The method of treating a synthetic rubber latex emulsion polymerizate of material selected from the group consisting of butadiene-1,3 hydrocarbons and mixtures of butadiene-1,3 hydrocarbons with compounds which contain a single $CH_2=C<$ group and are copolymerizable with butadiene-1,3 hydrocarbons, having an average particle diameter, based on the area of the particles, of from 0.05 to 0.5 micron and containing 3% to 25% by weight of the rubber solids of large particles from 5 to 50 microns in diameter to improve the strength of articles produced directly from such latex, which comprises allowing the latex to stand until a cream whose solids are composed substantially of large particles forms an upper layer in the latex and separating the cream and skimmed latex.

4. The method of making a synthetic rubber article from a synthetic rubber latex emulsion polymerizate of material selected from the group consisting of butadiene-1,3 hydrocarbons and mixtures of butadiene-1,3 hydrocarbons with compounds which contain a single $CH_2=C<$ group and are copolymerizable with butadiene-1,3 hydrocarbons, having an average particle diameter, based on the area of the particles, of from 0.05 to 0.5 micron and containing 3% to 25% by weight of the rubber solids of large particles from 5 to 50 microns in diameter which comprises separating at least 25% by weight of said large particles from the latex, and forming an article by direct deposition of synthetic rubber from the thus treated latex from which said large particles have been removed.

5. The method of making a synthetic rubber article from a butadiene polymer synthetic rubber latex having an average particle diameter, based on the area of the particles, of from 0.05 to 0.5 micron, and containing 3% to 25% by weight of the rubber solids of large particles from 5 to 50 microns in diameter which comprises allowing the latex to stand until a cream whose solids are composed substantially of large particles forms an upper layer in the latex, separating the cream and skimmed latex, and forming an article by direct deposition of synthetic rubber from the skimmed latex from which the large particles have been removed.

6. The method of treating a butadiene-styrene copolymer synthetic rubber latex having an average particle diameter, based on the area of the particles, of from 0.05 to 0.5 micron and containing from 3% to 25% by weight of the rubber solids of large particles from 5 to 50 microns in diameter to improve the strength of articles produced directly from such latex, which comprises separating at least 25% by weight of said large particles from the latex in the absence of chemical treatment of the latex.

7. The method of treating a butadiene-styrene copolymer synthetic rubber latex having an average particle diameter, based on the area of the particles, of from 0.05 to 0.5 micron and containing 3% to 25% by weight of the rubber solids of large particles from 5 to 50 microns in diameter to improve the strength of articles produced directly from such latex, which comprises allowing the latex to stand until a cream whose solids are composed substantially of large particles forms an upper layer in the latex and separating the cream and skimmed latex.

8. The method of making a synthetic rubber article from a butadiene-styrene copolymer synthetic rubber latex having an average particle diameter, based on the area of the particles, of from 0.05 to 0.5 micron and containing 3% to 25% by weight of the rubber solids of large particles from 5 to 50 microns in diameter which comprises separating at least 25% by weight of said large particles from the latex in the absence of chemical treatment of the latex, and forming an article by direct deposition of synthetic rubber from the thus treated latex from which said large particles have been removed.

9. The method of making a synthetic rubber article from a butadiene-styrene copolymer synthetic rubber latex having an average particle diameter, based on the area of the particles, of from 0.05 to 0.5 micron, and containing 3% to 25% by weight of the rubber solids of large particles from 5 to 50 microns in diameter which comprises allowing the latex in the absence of chemical treatment of the latex to stand until a cream of large particles forms an upper layer in the latex, separating the cream and skimmed latex, and forming an article by direct deposition of synthetic rubber from the skimmed latex from which said large particles have been removed.

References Cited in the file of this patent

UNITED STATES PATENTS

| | | |
|---|---|---|
| 2,393,133 | White | Jan. 15, 1946 |
| 2,467,053 | Rumbold | Apr. 12, 1949 |